Figure 1:
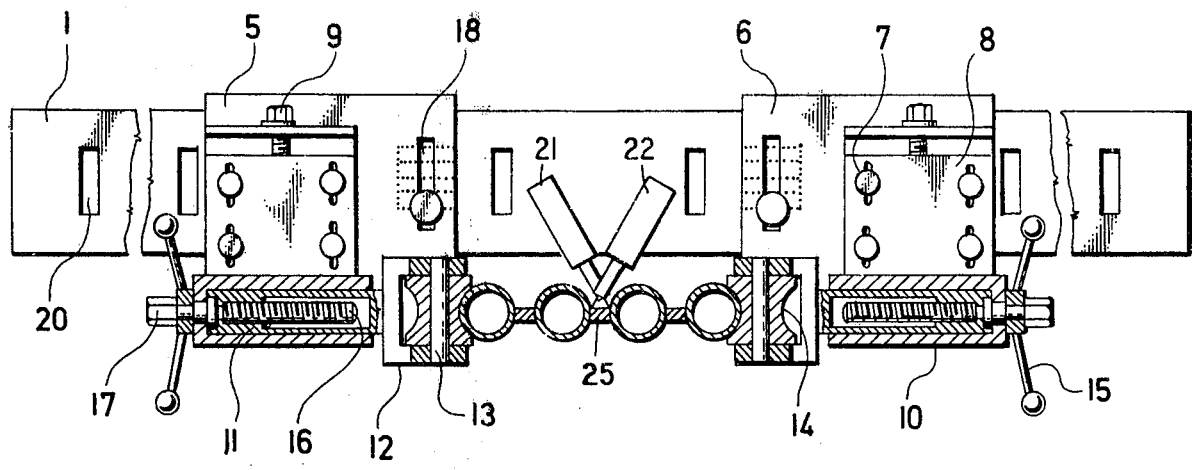

United States Patent [19]
Cervenka et al.

[11] 3,964,665
[45] June 22, 1976

[54] ADDITIONAL DEVICE FOR AN AUTOMATIC WELDING EQUIPMENT FOR FULLY WELDED TUBE WALLS

[75] Inventors: Juraj Červenka, Brno; Jaroslav Olešovský, Ricmanice, both of Czechoslovakia

[73] Assignee: Prvni Brnenska strojirna, Brno, Czechoslovakia

[22] Filed: June 10, 1974

[21] Appl. No.: 477,768

[30] Foreign Application Priority Data
June 11, 1973 Czechoslovakia.................. 4177-73

[52] U.S. Cl............................. 228/44.1 R; 219/79; 269/212; 228/243
[51] Int. Cl.².......................................... B23K 37/04
[58] Field of Search............. 228/6, 44, 49; 29/497, 29/497.5, 471.1; 219/107, 79; 269/212; 294/81 R

[56] References Cited
UNITED STATES PATENTS

| | | | |
|---|---|---|---|
| 1,638,848 | 8/1927 | Hargrave | 269/212 |
| 2,179,802 | 4/1939 | Sykes | 228/6 |
| 2,604,352 | 7/1952 | Gonser | 294/81 R |
| 2,993,983 | 7/1961 | Carpenter et al. | 29/497 |
| 3,159,129 | 12/1964 | Lindmark | 228/44 |
| 3,233,074 | 2/1966 | Smith | 228/6 X |
| 3,375,344 | 3/1968 | Kohler et al. | 219/107 |
| 3,585,709 | 6/1971 | Muller et al. | 29/497.5 |

*Primary Examiner*—Al Lawrence Smith
*Assistant Examiner*—K. J. Ramsey
*Attorney, Agent, or Firm*—Burgess, Ryan and Wayne

[57] ABSTRACT

Apparatus for automatically welding pipe comprising a cross member positioned between first and second draw rolls, said guide is mounted on said cross member along with adjustable supports containing profile rolls for urging together pipes to be welded.

2 Claims, 2 Drawing Figures

U.S. Patent    June 22, 1976    3,964,665

ADDITIONAL DEVICE FOR AN AUTOMATIC WELDING EQUIPMENT FOR FULLY WELDED TUBE WALLS

This invention relates to an additional device for automatic welding equipment for fully welded tube walls which are also known as the so-called membrane walls.

The conventional welding of tube walls is made by means of two welding heads placed between the first pair and the second pair of draw rolls of automatic welding equipment. Between the pairs of rolls are located pressing rollers by means of which the tubes are pushed against strips. The pressing rollers make possible to clamp the welded piece of two tubes or of four tubes, if these are of a smaller dimension. Automatic welding equipment equipped in this way does not permit to weld the end of the tube wall. As a rule, there remains a section of 350 to 400 mm which must be rewelded manually in the course of further working of the tube wall. This method of manufacture results in higher production costs and an impaired general quality of the welded joint. With manual welding, achieving deep weld penetration, as deep as that with automatic welding, cannot generally be obtained.

The present invention aims to eliminate the said disadvantages. In automatic welding equipment for fully welded tube walls comprising two welding heads placed between the first pair and the second pair of draw rolls, and according to the invention, there is fixed into the space between the said first pair and the said second pair of draw rolls a cross member to the frame of the automatic welding equipment. On the guide of the said cross member, adjustable supports are arranged which supports bear profile rollers pushing the tubes to the strip. According to the width of the tube walls, the supports are adjusted on the guide and fixed by pushing in a pawl into the groove in the cross member, as will be more clearly explained in the detailed description which follows below.

It is advantageous to fix e.g. by means of screws to the supports, bodies which are adjustable as to height. The bottom of these bodies is made as a hub in which a displaceable sleeve is arranged which sleeve bears on its end a fork wherein a profile roller is pivoted on a pin.

The force needed to push the tubes to the strip may be obtained mechanically or also hydraulically or pneumatically.

The additional device according to the invention makes it possible to weld the tube wall up to the end in the maximum width which passes through the machine and within the required width tolerance of the tube wall.

Figure 2:
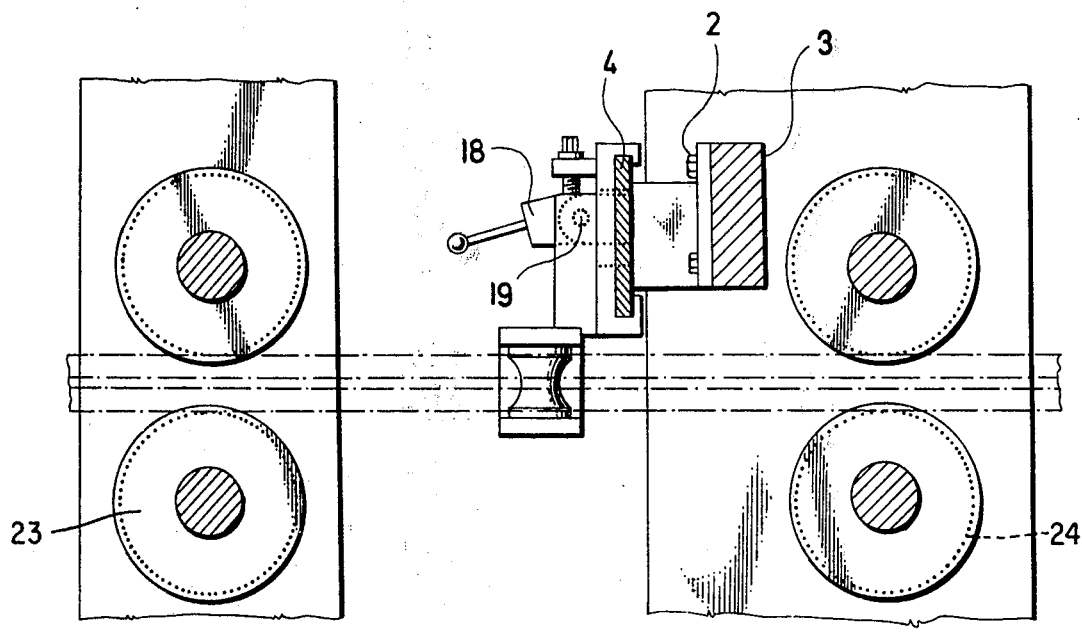

An embodiment of the invention is shown in the accompanying drawing where FIG. 1 shows a front view of the additional device and FIG. 2 the fixation of the additional device to the automatic welding equipment.

The device comprises a cross member 1 fixed by means of screws 2 to the frame 3 of the automatic welding equipment. On the cross member 1 is a guide 4 on which supports are manually slidable, namely the right support 5 and the left support 6. On the supports 5, 6, are fixed by means of holding screws 7 the bodies 8 which are adjusted as to height by means of the adjusting screw 9. The bottom of the body 8 is made as a hub 10 in which hub 10 slides the sleeve 11 which bears at its end a fork 12. In the fork 12 a profile roller 14 is pivoted on a pin 13. The sleeve 11 is pushed out by means of a reamer wrench fixed on the screw 16. The screw 16 is provided on its end with a hexagon 17 so that by means of a wrench or a rattle wrench the force necessary for closing the tube wall can be obtained.

The supports 5, 6, are adjusted manually on the guide 4 according to the width of the welded wall and secured by means of pawls 18 which are pivotally mounted by means of pins 19. The pawls 18 fit in into the grooves 20 in the cross member 1. The pitch of the grooves 20 is smaller than the travel of the sleeve 11.

As is clearly seen in the drawing, a pair of welding heads 21, 22 is positioned to weld the weld strips to the tubes. In FIG. 1, the welding heads 21, 22 are shown welding two adjacent tubes together through the medium 7 of a single welding strip.

Welding is achieved by first clamping the tubes together between rollers 14, 23 and 24, advancing the tubes under the welding heads, thereby welding a strip 25, and then turning the tubes over and welding the other side of the welding strip 25 to the tubes.

It is to be understood that many modifications may be made in and to the above described embodiment by those skilled in the art. It is intended to cover all such modifications which do not represent departures from the spirit and scope of the invention as defined in the appended claims.

We claim:

1. A device for automatic welding equipment for fully welded tube walls joined by a strip comprising a first and second pair of draw rolls, a cross member provided with a guide, two welding heads placed between the first pair and the second pair of draw rolls wherein into the space between the said first pair and the said second pair of draw rolls the cross member is fixed to the frame of the automatic equipment, profile rollers pushing the tubes into the strip, bodies, screws in said bodies for selectively affixing said bodies to said guide in a plurality of vertical positions, a hub on the bottom of each of said bodies, a horizontally displaceable sleeve in each of said hubs, a fork on an end of each of said sleeves, and a pin in each of said forks, said profile rollers being pivotably mounted in said pins, said bodies, screws, hubs, sleeves, forks and pins constituting adjustable supports on the guide of said cross member.

2. A device as in claim 1 including support members wherein said bodies are adjustably secured to said support members by said screws, said support members being securable in a plurality of horizontal positions on said guide of said cross member, and means selectively locking said support members to said guide.

* * * * *